(12) United States Patent
Krishnan et al.

(10) Patent No.: US 10,599,492 B2
(45) Date of Patent: Mar. 24, 2020

(54) CONTEXT-AWARE CONNECTORS IN INTEGRATION

(71) Applicant: International Business Machines Corporation, Armonk, NY (US)

(72) Inventors: Subramanian Krishnan, Mysore (IN); Sargam Singh, Jeevan Bhima Nagar (IN)

(73) Assignee: International Buisness Machines Corporation, Armonk, NY (US)

(*) Notice: Subject to any disclaimer, the term of this patent is extended or adjusted under 35 U.S.C. 154(b) by 82 days.

(21) Appl. No.: 15/795,462

(22) Filed: Oct. 27, 2017

(65) Prior Publication Data

US 2019/0129770 A1 May 2, 2019

(51) Int. Cl.
*G06F 9/54* (2006.01)

(52) U.S. Cl.
CPC .................. *G06F 9/544* (2013.01)

(58) Field of Classification Search
None
See application file for complete search history.

(56) References Cited

U.S. PATENT DOCUMENTS

| 9,197,643 | B2 | 11/2015 | Dunphey et al. | |
|---|---|---|---|---|
| 2003/0195997 | A1* | 10/2003 | Ibert | G06F 9/542 719/318 |
| 2005/0005116 | A1* | 1/2005 | Kasi | G06Q 10/10 713/170 |
| 2006/0005204 | A1* | 1/2006 | Siegel | G06F 16/25 719/313 |
| 2010/0094674 | A1* | 4/2010 | Marriner | G06Q 10/06 705/26.1 |
| 2015/0019553 | A1* | 1/2015 | Shaashua | H04W 4/70 707/737 |
| 2016/0299960 | A1 | 10/2016 | Chene et al. | |

FOREIGN PATENT DOCUMENTS

WO    WO2015188781    12/2015

OTHER PUBLICATIONS

Mell et al., "The NIST Definition of Cloud Computing", National Institute of Standards and Technology, U.S. Dept. of Commerce, NIST Special Publ. 800-145, Sep. 2011, 7 pages.

* cited by examiner

*Primary Examiner* — Shih-Wei Kraft
(74) *Attorney, Agent, or Firm* — Heslin Rothenberg Farley & Mesiti P.C.; Michael Petrocelli, Esq.

(57) ABSTRACT

A method, computer program product, and system includes a processor(s) obtaining, at a first connector, contextual information related to one or more additional connectors within a potential communication path of the first connector, where each of the one or more additional connectors initializes data transmission connections to a respective application. The processor(s) accesses usage policy metadata of a second application (the respective application of a second connector of the one or more additional connectors). The processor(s) determines whether initializing a data transmission connection between the first application and the second application is consistent with the contextual information related to the second connector and the usage policy metadata. Based on determining that the contextual information and the usage policy metadata are inconsistent, the processor(s) transmits an error. Based on determining that the contextual information and the usage policy metadata are consistent, the processor(s) initializes the data transmission.

17 Claims, 6 Drawing Sheets

CONTEXT-AWARE CONNECTORS IN INTEGRATION

BACKGROUND

Connectors are software abstractions that provide canonical interfaces for interacting with applications to perform discovery and runtime operations. By utilizing a connector, an integration platform may communicate with any application in a generic manner. Once integrated into a platform, though, a developer of the connector has no control over the use on the connector by an end user of the integration platform within the context of the platform.

SUMMARY

Shortcomings of the prior art are overcome and additional advantages are provided through the provision of a method for determining whether to enable communications between applications. The method includes, for instance: obtaining, by one or more processors, at a first connector, wherein the first connector initializes data transmission connections to a first application, contextual information related to one or more additional connectors within a potential communication path of the first connector, wherein each of the one or more additional connectors initializes data transmission connections to a respective application; accessing, by the one or more processors, usage policy metadata of a second application, wherein the second application comprises the respective application of a second connector of the one or more additional connectors; determining, by the one or more processors, whether initializing a data transmission connection between the first application and the second application is consistent with the contextual information related to the second connector and the usage policy metadata; based on determining that the contextual information and the usage policy metadata are inconsistent, transmitting, by the one or more processors, an error; and based on determining that the contextual information and the usage policy metadata are consistent, initializing, by the one or more processors, the data transmission connection between the first application and the second application.

Shortcomings of the prior art are overcome and additional advantages are provided through the provision of a computer program product for determining whether to enable communications between applications. The computer program product comprises a storage medium readable by a processing circuit and storing instructions for execution by the processing circuit for performing a method. The method includes, for instance: obtaining, by the one or more processors, at a first connector, wherein the first connector initializes data transmission connections to a first application, contextual information related to one or more additional connectors within a potential communication path of the first connector, wherein each of the one or more additional connectors initializes data transmission connections to a respective application; accessing, by the one or more processors, usage policy metadata of a second application, wherein the second application comprises the respective application of a second connector of the one or more additional connectors; determining, by the one or more processors, whether initializing a data transmission connection between the first application and the second application is consistent with the contextual information related to the second connector and the usage policy metadata; based on determining that the contextual information and the usage policy metadata are inconsistent, transmitting, by the one or more processors, an error; and based on determining that the contextual information and the usage policy metadata are consistent, initializing, by the one or more processors, the data transmission connection between the first application and the second application.

Methods and systems relating to one or more aspects are also described and claimed herein. Further, services relating to one or more aspects are also described and may be claimed herein.

Additional features are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

DETAILED DESCRIPTION

Figure 1:
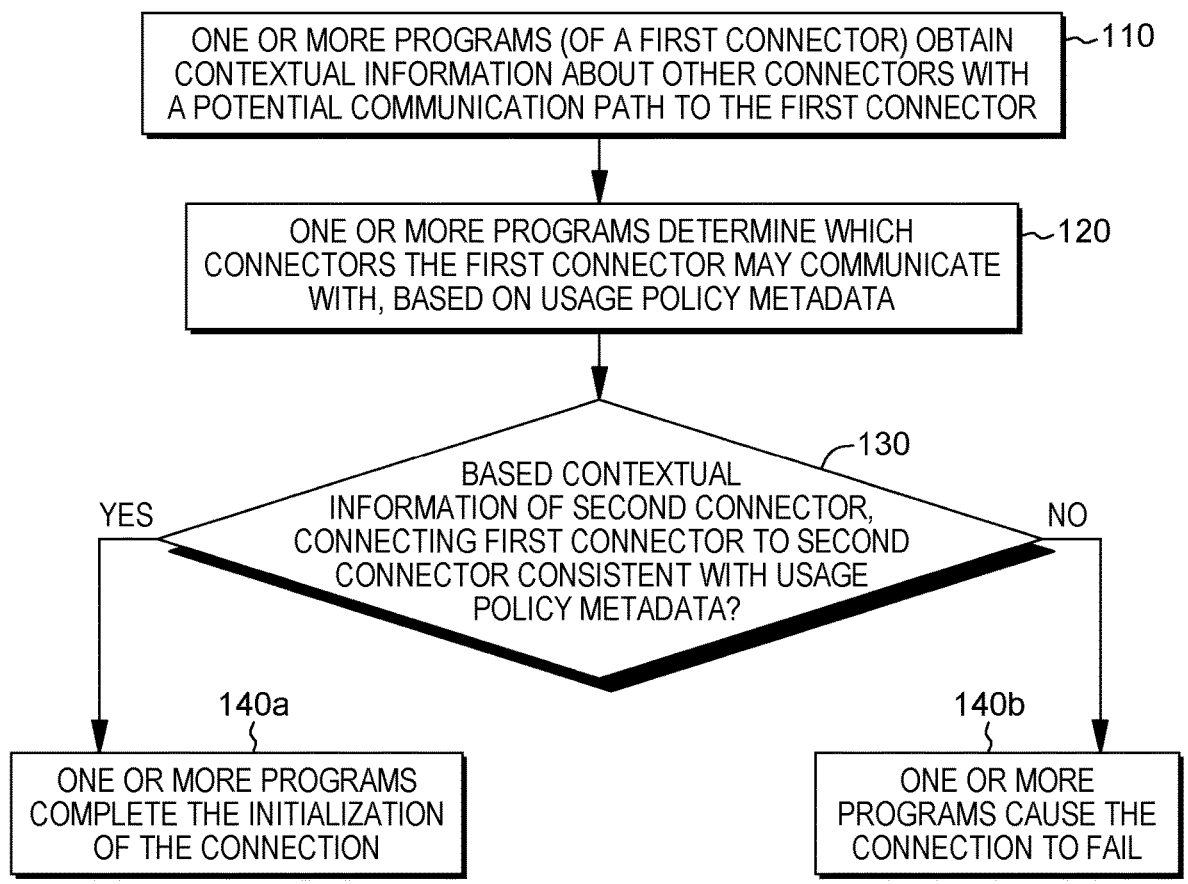
FIG. 1 is a workflow illustrating certain aspects of an embodiment of the present invention.

The accompanying figures, in which like reference numerals may refer to identical or functionally similar elements throughout the separate views and which are incorporated in and form a part of the specification, further illustrate the present invention and, together with the detailed description of the invention, serve to explain the principles of the present invention. As understood by one of skill in the art, the accompanying figures are provided for ease of understanding and illustrate aspects of certain embodiments of the present invention. The invention is not limited to the embodiments depicted in the figures.

Figure 4:
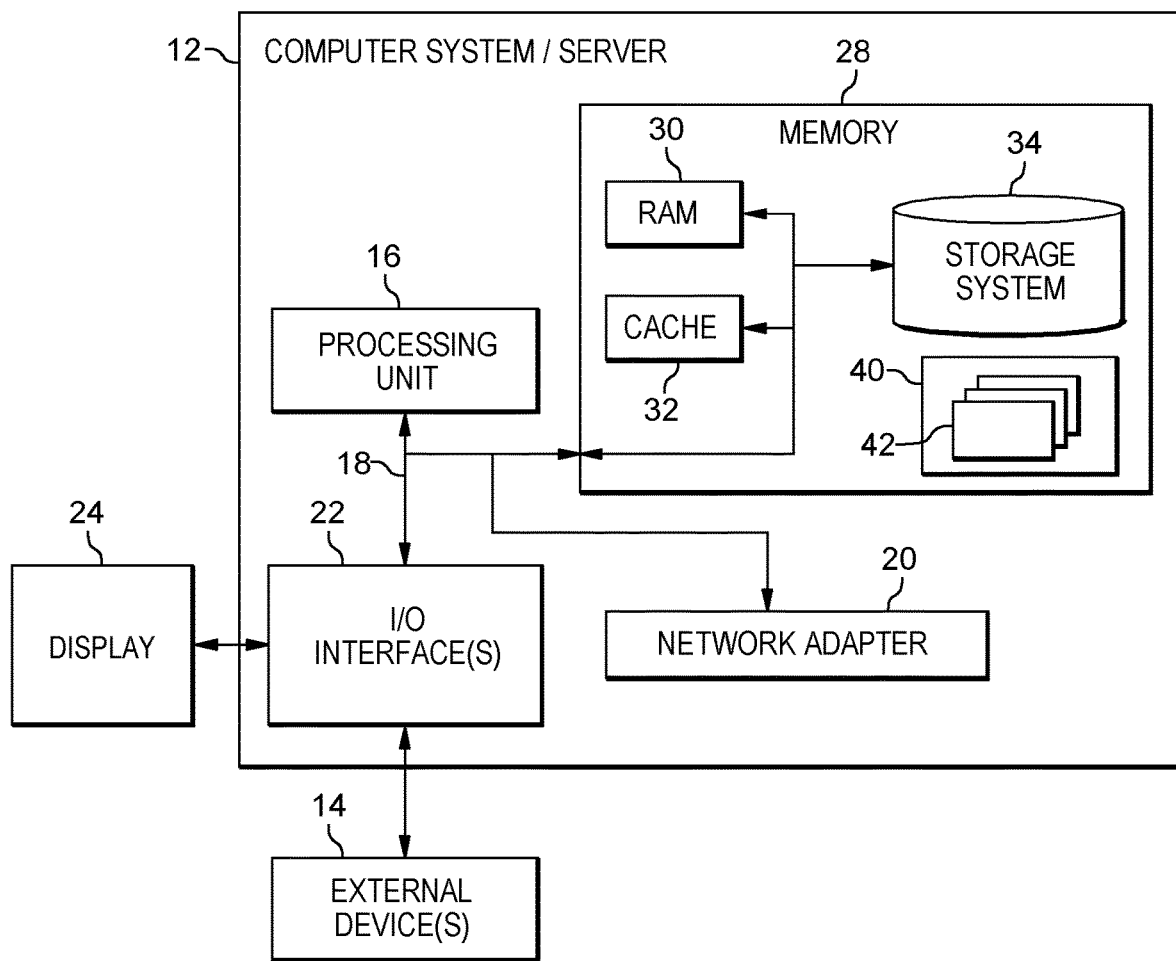
FIG. 4 depicts one embodiment of a computing node that can be utilized in a cloud computing environment.

As understood by one of skill in the art, program code, as referred to throughout this application, includes both software and hardware. For example, program code in certain embodiments of the present invention includes fixed function hardware, while other embodiments utilized a software-based implementation of the functionality described. Certain embodiments combine both types of program code. One example of program code, also referred to as one or more programs, is depicted in FIG. 4 as program/utility 40, having a set (at least one) of program modules 42, may be stored in memory 28.

Embodiments of the present invention include computer-implemented methods, computer program products, and computer systems, which enable a connector to be utilized in an integration platform with relation to other applications in a manner where the constraints mandated by these applications remain in force. In embodiments of the present invention, connectors and applications determine the rules for interacting with other connectors and applications. In other words, a connector will not be able to connect applications, an application and a platform, and/or platforms, for which such a connection between these entities would violate the policies of any of the subject entities. In embodiments of the present invention, the one or more programs that comprise the connector enforce the constraints the entities which it connects to an integration platform by utilizing at least two aspects. First, in some embodiments of the present invention, the one or more programs comprising the connector determine which connectors are allowed to communicate with the given entity (e.g., application), and which are not allowed to communicate with the entity. The one or more programs make this determination by obtaining a metadata usage policy of the entity. The metadata may be statically available to the one or more programs and/or the one or more programs may retrieve the metadata dynamically, for example, by making an application programming interface (API) call to the entity. Second, in some embodiments of the present invention, at initialization of a connection between two entities, via the connector, the one or more programs (e.g., utilizing an initialization logic of the connector) determine whether contextual information of the connector at startup complies with usage policy metadata of the entities. Based on determining that the connection is in compliance with the policy, the one or more programs initialize the connection between the entities. Based on determining that the connection is not in compliance with the policy, the one or more programs do not initialize the connection between the entities and/or generate an error message indicating a connection failure.

Aspects of embodiments of the present invention represent improvements to existing computing technology and are inextricably tied to computing. For example, some embodiments of the present invention represent improvements over existing connectors are least because in these embodiments, the one or more programs that comprise the connector determine, based implementation metadata and/or based on information available from an application endpoint API, what other connectors the application may interact with, within the constraints of the application. Thus, the one or more programs are able to determine which other applications the application endpoint API may communicate and/or otherwise interact with, as well as what types of interactions are permitted with the other applications. Thus, in embodiments of the present invention, a control mechanism built in at the endpoint level to control inter-entity communications. Through the functionality of the one or more programs, in embodiments of the present invention, the connectors possess the intelligence to decide what interactions are permissible and which ones should be prohibited. Thus, in embodiments of the present invention, endpoint connectors provide a mechanism for an endpoint application to control which other applications with which it communicates (e.g., sends data). Some existing system rely upon an administrator to define connectivity rules, but in embodiments of the present invention one or more programs enforce policies within a connector for an application, thus, enabling the application itself, and/or the provider of the application, to control communications of this application with other applications.

In addition to providing improvement to existing computing technology that is inextricably tied to computing that is provided by aspects of embodiments of the present invention enables provides more static control from the standpoint of a developer of a connector than is afforded by existing connectors, which can often be repurposed by platform integrators, in violation of service policies. For example, embodiments of the present invention provide a mechanism for application endpoint vendors to exercise a level of control regarding how retrieved data is shared. In embodiments of the present invention, connector usage policies which cannot be over-ridden and/or violated by business policies defined by users/consumers of platform. Rather, policies enforced by the one or more programs of the connector are secure from user modification, for example, via a business rules engine. Rather than define policies in a business rules engine, as done in some existing systems, in some embodiments of the present invention, the policies utilized by the one or more programs, upon which the one or more programs base connections, are part of the connector metadata. This distinction is functionally relevant because the contents of a business rules engine can be modified by users, including administrators, while the connector metadata, in embodiments of the present invention, cannot be modified by the platform consumer/user. In some embodiments of the present invention, one or more programs embed connector usage policy in a connector and enforce the connector usage policy, sometimes based on communicating with an endpoint application, to determine how to enforce the policy.

FIG. 1 is a workflow 100 that illustrates certain aspects of some embodiments of the present invention. As illustrated in the workflow 100, embodiments of the present invention provide a layered approach to ensuring that a connector makes only an authorized connection with another entity. In the illustrated embodiment of the present invention, one or more programs comprising a connector, which may be hardware-based, or may be executed on at least one processing resource in a computing environment, obtain contextual information about other connectors in one or more communication path (e.g., in the flow) of a computer network in which the connector is communicatively coupled. The one or more programs of a first connector obtain contextual information about other connectors with a potential communication channel to the first connector (110). Thus, the one or more programs may receive data both from connectors to which the one or more programs may send data, within the network, and to those connectors from which the one or more programs may accept data, in the network, based on the network path(s).

In some embodiment of the present invention, the one or more programs of a connector determine a flow of a network in order to obtain contextual information about other connectors in the flow. For example, in a computing network, a component responsible for deploying a flow, reads the flow document and for each connector. In embodiments of the present invention one or more programs of a connector, including the first connector, determine the flow in order to obtain contextual information from relevant connectors. Thus, in some embodiments, when a connector is started as a part of the deployment of the flow, the aforementioned deployment component extracts from the flow document contextual information regarding this connector. The one or more programs of the first connector may obtain the contextual information regarding other connectors as an initialization parameter to the first connector.

Example 1 below is pseudocode that illustrates how a Marketo Connector, which can be utilized as the first connector referenced in FIG. 1, can be passed contextual information extracted from a flow document. A Marketo Connector is an example of one connector that can be utilized in embodiments of the present invention. This connector specifically enables users to access resources in a cloud computing system.

Example 1

```
{
self:
    { name: marketo, operation: retrieve, object: Account, properties:[...]},
out:
    [
    { name: hubspot, operation: create, object: Account, properties:[...]}
    ]
}
```

Example 2 below is pseudocode that illustrates how a HubSpot Connect Connector, which can be utilized as the first connector referenced in FIG. 1, can be passed in this context. A HubSpot Connect Connector is utilized primarily to integrate customer relations management (CRM) software platforms.

Example 2

```
{
self:
    { name: hubspot, operation: create, object: Account, properties:[...]},
in:
    [
{ name: marketo, operation: retrieve, object: Account, properties:[...]}
    ]
}
```

Upon obtaining the contextual information, regarding which connectors that one or more programs of the first connector, may potentially exchange data with, based on the path(s) of the network, the one or more programs determine which connectors (from those in the flow/path) the first connector may communicate with, based on usage policy metadata (120). The one or more programs may determine which connectors the connector that embodies the one or more programs is allowed to communicate with, by reading the usage policy metadata, which may be available from a static source. For example, in some embodiments of the present invention, the metadata are statically available in the connector (as a part of its implementation). In some embodiments of the present invention, the one or more programs retrieve the metadata dynamically, for example, by making an API call to an application to which the one or more programs seek to connect. In some embodiments of the present invention, the metadata comprises a white-list that indicates authorized connections under the policy, while in other embodiments, the metadata comprises a black-list that indicates unauthorized connections under the policy.

In some embodiments of the present invention, the one or more programs obtain the usage policy metadata and determine which connectors (in the flow) a connector may communicate with, during the initialization of the connector itself. Thus, during its initialization the one or more programs in the connector read metadata for which connectors that the initial connector is allowed to talk to, based on the policy. As aforementioned, policy information may be available to the one or more programs of the connector as static data or via an API call to an application. The policy may take the form of a blacklist or a whitelist, meaning that the policy may provide a list of disallowed connections and/or a list of permitted connections. Below is an example of a possible policy that the one or more programs may read, in this example, a Marketo Connector is utilized. Example 3 is merely one example of a policy and this is a simplified example, offered for illustrative purposes. As understood by one of skill in the art, embodiments of the present invention can utilize more complex policies with granular details, for example, what kind of associations between the two connector types are in compliance with the policy.

Example 3

```
blacklist: {
hubspot: {direction: out, operations: [create, update], objects: ALL}
}
```

By reading the pseudocode representing a policy in Example 3, the one or more programs determine that the Marketo connector cannot be used where data goes out from it to a Hubspot connector, which does create or update an operation, irrespective of the object.

Returning to FIG. 1, upon commencing initialization of a connection between the first connector and a second connector, where the second connector is one of the other connectors, the one or more programs of the first connector determine if the contextual information of the second connector would render the connection consistent with the usage policy metadata (130). The second connector would be an endpoint of the connection formed. The one or more programs making this determination may be characterized as the initialization logic of the first connector. Based on determining that the contextual information is consistent, the one or more programs complete the initialization of the connection (140a). Based on determining that the contextual information is not consistent, the one or more programs cause the connection to fail (140b). In causing a connection failure, the one or more programs may report an error rather than complete the connection. In some embodiments of the present invention, if any of the connector fails the initialization step, then the one or more programs mark the flow deployment as failed. If all connectors are successfully initialized, then one or more programs may mark the flow as successfully started.

Figure 2:
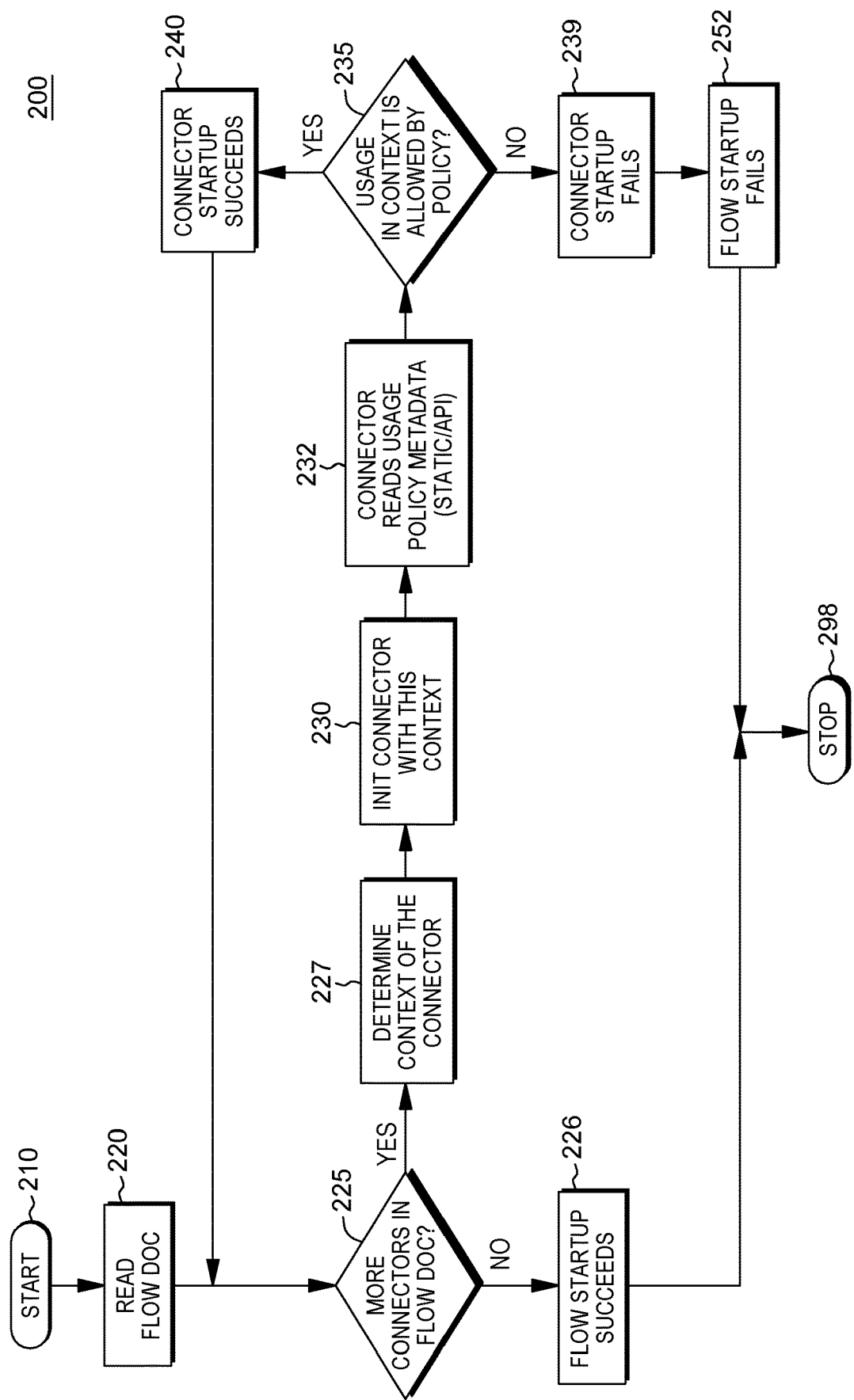
FIG. 2 is a workflow illustrating certain aspects of an embodiment of the present invention.

FIG. 2 illustrates a workflow 200 that details aspects of starting a flow in various embodiments of the present invention. At the start (210) of this workflow 200 one or more programs of a first connector read a flow document for the network (220). The one or more programs determine if there are more connectors in the flow document, with which the first connector may seek to communicate, over a network connection (225). If there are no connectors, the flow startup succeeds (226) and the process is complete (298), i.e., the one or more programs may communicate within defined contexts, or may not communicate with the additional connectors, which are known. When there are no more connectors in the flow document (225), the connectivity limitations of the first connector and any additional connectors is already known.

In some embodiments of the present invention, if the one or more programs determine that there are more connectors in the flow document (225), the one or more programs of the first connector then determines whether the first connector may connect to these additional connectors. Thus, for each connector, the one or more programs of the first connector determine the context of the new connector (227). The one or more programs of the first connector commence initialization a connection between the connector and the new connector with the context (230). Upon commencing initialization, the one or more programs read a usage policy of the new connector (232). The usage policy may be comprised of metadata and depending upon the new connector and the configuration and embodiment of the present invention can be static metadata or can be dynamic and can be attained by the one or more programs by connecting to an API. Upon obtaining the policy, the one or more programs determine is usage in the context is allowed under the policy (235). If the one or more programs determine that usage in the context is allowed under the policy, the one or more programs complete initialization of the connection between the connector and the new connector (240). As discussed above, this initialization process is repeated by the one or more programs for each additional connector in the flow document (225).

In some embodiments of the present invention, if the one or more programs determine that the usage in the context is not permitted by the policy, the one or more programs cause the initialization to fail (239). Thus, a connection is not initialized between the first connector and the new connector. Hence, the flow startup fails (252), completing this process (298).

Although FIGS. 1-2 illustrate how certain aspects of embodiments of the present invention determine connection policies within a network as part of flow deployment, other embodiments of the present invention may employ some of these aspects at differing times. For example, some embodiments of the present invention include one or more programs executed by at least one processing circuit that perform the policy aspects of embodiments of the present invention during the runtime operations on a connector. Thus, when an operation is performed on a deployed connector, one or more programs of the connector obtain context information is passed as a parameters in the invocation. One or more programs of the endpoint application determines, based on the context and the operation in question, whether the operation should be allowed or failed. Thus, the application (endpoint) enforces the policy rather than the integration platform.

Figure 3:
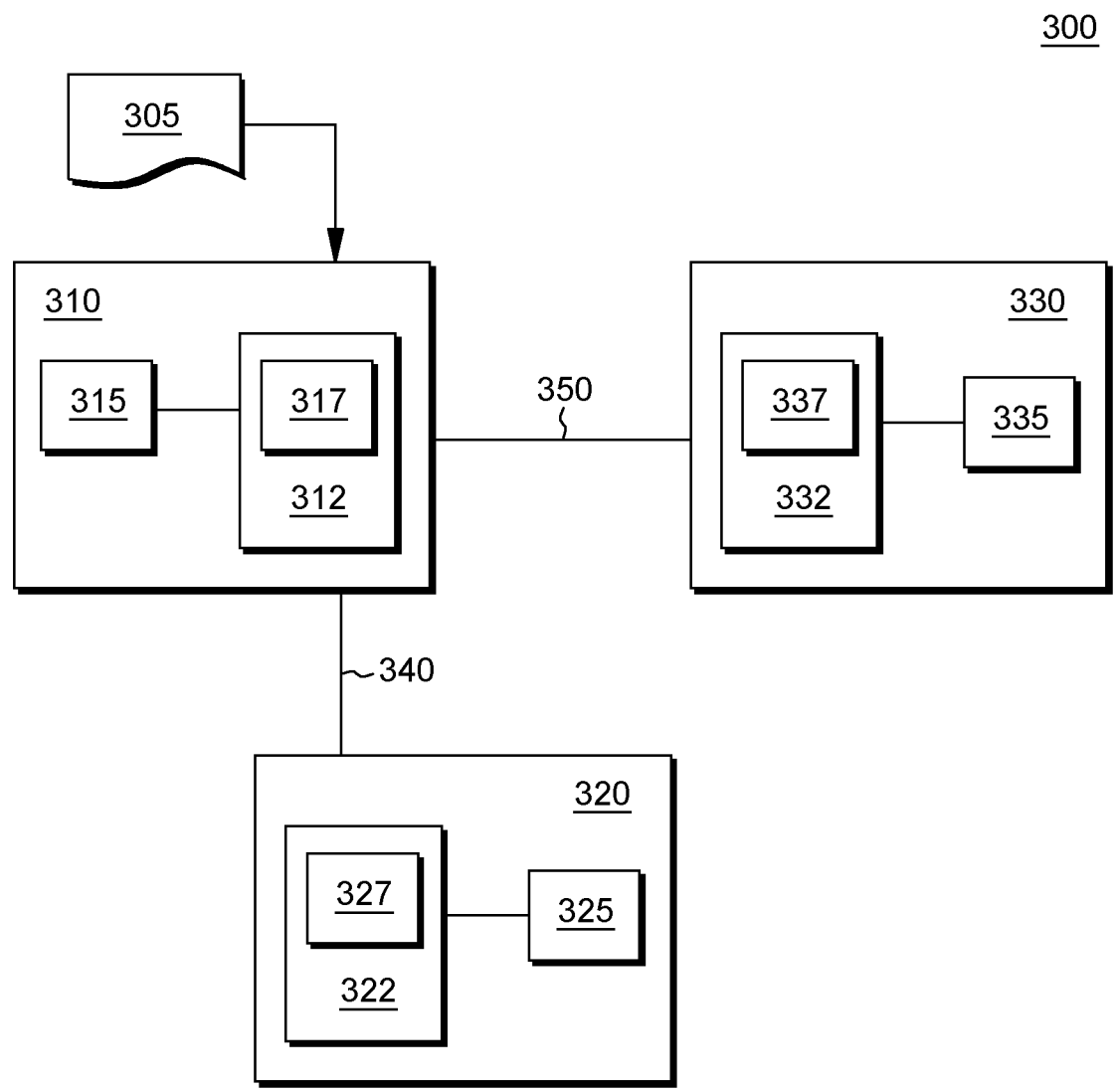
FIG. 3 is an illustration of various aspects of a technical environment in which aspects of embodiments of the present invention may be implemented.

FIG. 3 is an example of a portion of a computing environment 300 where context-aware connectors in application integration platforms are utilized in accordance with certain aspects of embodiments of the present invention to provide controlled transmission/communication of data between applications through associated connectors. In FIG. 3, one or more programs of a first connector 312 in a first application integration platform 310 have successfully formed a connection between the first application 315 of the first application integration platform 310 and both a second application 325 and a third application 335 of respective application integration platforms 320 330, through the connectors 322 332 of these platforms 320 330. By forming these connections, the one or more programs in the first connector 312 enable the transmission/communication of data between the first application 315 and the second application 325 and the first application 315 and the third application 335.

FIG. 3 illustrates the applications 315 325 335 as being internal to their respective application integration platforms 310 320 330. However, as understood by one of skill in the art, this is merely one possible configuration. The application integration platforms 310 320 330 may also be utilized to connect applications external to the platforms that are communicatively connected to the platforms. The configuration in FIG. 3 was selected for ease of understanding, not to provide any structural limitations to the technical architecture.

As aforementioned. FIG. 3 depicts three application integration platforms 310 320 330 with context-aware connectors 312 322 332. Before forming the pictured connections 340 350, in accordance with various aspects of embodiments of the present invention one or more programs of the connector 312 of the first application integration platform 310, determined that the first application 315 in the first application integration platform 310 was permitted to communicate with the applications 325 335 of the additional application integration platform 320 330, through their respective connectors 322 332, to provide transmission/communication of data between applications 315 325 335 through associated connectors 312 322 332.

As also described in FIGS. 1-2, in order to determine whether the first application 315 is permitted to communicate and to transmit data to other applications 325 335, the one or more programs obtain contextual information 305 about the other connectors 322 332 in the flow (see, e.g., FIG. 1, 110 and FIG. 2, 227). The one or more programs may obtain the contextual information 305 from a network flow document (see, e.g., FIG. 2, 220). The connectors 322 332 in the computing environment 300 considered in the flow are those that may send and receive data to the first connector 312, based on the configuration of the network.

Before forming each connection 340 350, the one or more programs in the first connector 312 access the usage policy metadata 327 337 of each additional application integration platform 320 330, which is illustrated in FIG. 3 as being statically available in the connectors 322 332 of the application integration platforms. However, in some embodiments of the present invention, the one or more programs of the first connector 312 may access (and read) the usage policy metadata, which is not statically available in the connectors 322 332, but, rather, available in the applications 325 335, by making an API call to the applications 325 335. Based on the usage policy metadata 327 of the second application integration platform 320, the one or more programs determine whether the first connector 312 can communicate with the second connector 322, and based on the usage policy metadata 337 of the third application integration platform 320, the one or more programs determine whether the first connector 312 can communicate with the third connector 332.

Before completing the initialization of the connection 340 between the first application 315 and the second application 325, the one or more programs determine whether the contextual information 305 obtained by the connector 312 at startup complies with usage policy metadata 327 obtained from the second application integration platform 320. If the one or more programs determine that the contextual information 305 complies with usage policy metadata 327, the one or more programs of the first connector 312 initialize a connection 340 between the first application 315 and the second application 325, through the connectors 312 322. If the one or more programs determine a lack of compliance, the one or more programs do not initialize a connection between the applications and may report an error.

Likewise, before completing the initialization of the connection 350 between the first application 315 and the third application 335, the one or more programs determine whether the contextual information 305 obtained by the connector 312 at startup complies with usage policy metadata 327 obtained from the third application integration platform 330. If the one or more programs determine that the contextual information 305 complies with usage policy metadata 327, the one or more programs of the first connector 312 initialize a connection 350 between the first application 315 and the third application 335, through the connectors 312 332. If the one or more programs determine a lack of compliance, the one or more programs do not initialize a connection between the applications and may report an error.

The portion of the one or more programs that check whether the contextual information of the connector at startup complies with usage policy metadata or not may be characterized as the initialization logic of the connector 312.

Embodiments of the present invention include a computer-implemented method, a computer program product, and a computer system where one or more programs, executed by one or more processors, obtain, at a first connector, where the first connector initializes data transmission connections to a first application, contextual information related to one or more additional connectors within a potential communication path of the first connector, wherein each of the one or more additional connectors initializes data transmission connections to a respective application. The one or more programs access usage policy metadata of a second application, where the second application comprises the respective application of a second connector of the one or more additional connectors. The one or more programs determine whether initializing a data transmission connection between the first application and the second application is consistent with the contextual information related to the second connector and the usage policy metadata. Based on determining that the contextual information and the usage policy metadata are inconsistent, the one or more programs transmit an error. Based on determining that the contextual information and the usage policy metadata are consistent, the one or more programs initialize the data transmission connection between the first application and the second application.

In some embodiments of the present invention, each of the data transmission connections to a first application are selected from the group consisting of: a bilateral connection for data flow and a unilateral connection for the data flow.

In some embodiments of the present invention, based on initializing the data transmission connection between the first application and the second application, the one or more programs obtain, by the first application, over the data transmission connection, data originating from the second application. Obtaining the data in this manner may include obtaining the data, by the first application, via the first connector and the second connector, wherein the first connector and the second connector connect the first application to the second application over the data transmission connection.

In some embodiments of the present invention, the one or more programs obtain the contextual information related to one or more additional connectors by reading a flow document of a computing network comprising the one or more processors.

In some embodiments of the present invention, the one or more programs obtain the contextual information related to one or more additional connectors by obtaining the contextual information during runtime operations on the first connector.

In some embodiments of the present invention, the contextual information includes a parameter of invocation of the first application.

In some embodiments of the present invention, the one or more programs access the usage policy metadata by reading static metadata of the second connector.

In some embodiments of the present invention, the one or more programs access the usage policy metadata by making a call to the second application via an application programming interface and receiving, via the application programming interface, dynamic metadata responsive to the call.

In some embodiments of the present invention, the one or more programs determine whether initializing the data transmission connection between the first application and the second application is consistent with the contextual information related to the second connector and the usage policy metadata is based on initialization logic of the first connector.

In some embodiments of the present invention, the one or more programs determine whether initializing the data transmission connection between the first application and the second application is consistent with the contextual information related to the second connector and the usage policy metadata is commenced subsequent to commencing initializing the data transmission connection.

In some embodiments of the present invention, the usage policy metadata include a description of connectors permitted to connect to the second application.

In some embodiments of the present invention, the usage policy metadata include a description of connectors not permitted to connect to the second application.

In some embodiments of the present invention, the usage policy metadata include a description of purposes for which data transmission to the second application is permitted.

In some embodiments of the present invention, the one or more programs update the flow document, with contextual information related to the first connector.

In some embodiments of the present invention, prior to obtaining the contextual information, the one or more programs deploy the first connector in a computing environment.

Referring now to FIG. 4, a schematic of an example of a computing node, which can be a cloud computing node 10. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove. In an embodiment of the present invention, the application integration platforms 310 320 330 can all be understood as part of one or more cloud computing nodes 10 (FIG. 4) and if not part of a cloud computing node 10, then one or more general computing node that includes aspects of the cloud computing node 10.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 4, computer system/server 12 that can be utilized as cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs). Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter). Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
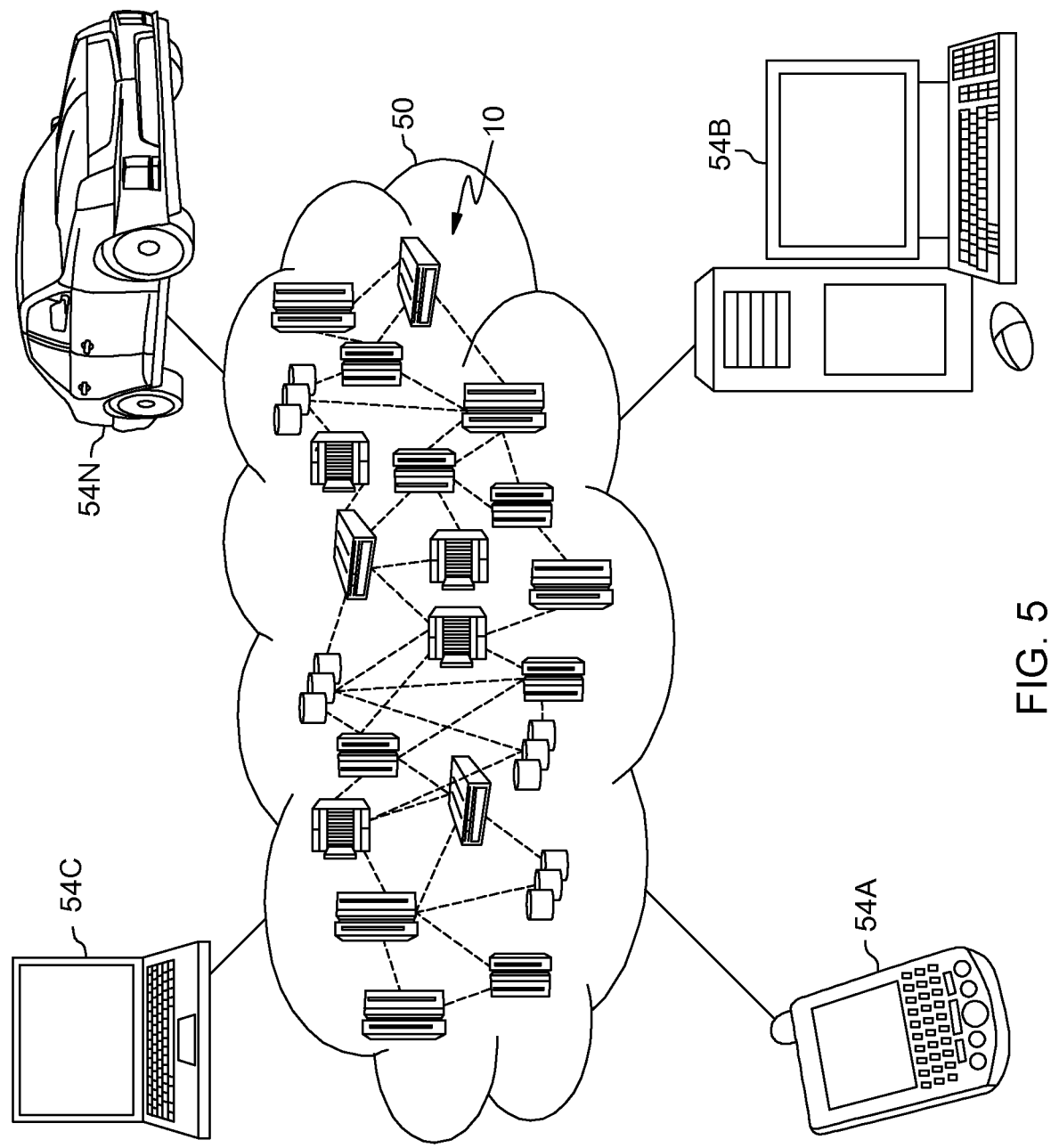
FIG. 5 depicts a cloud computing environment according to an embodiment of the present invention.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
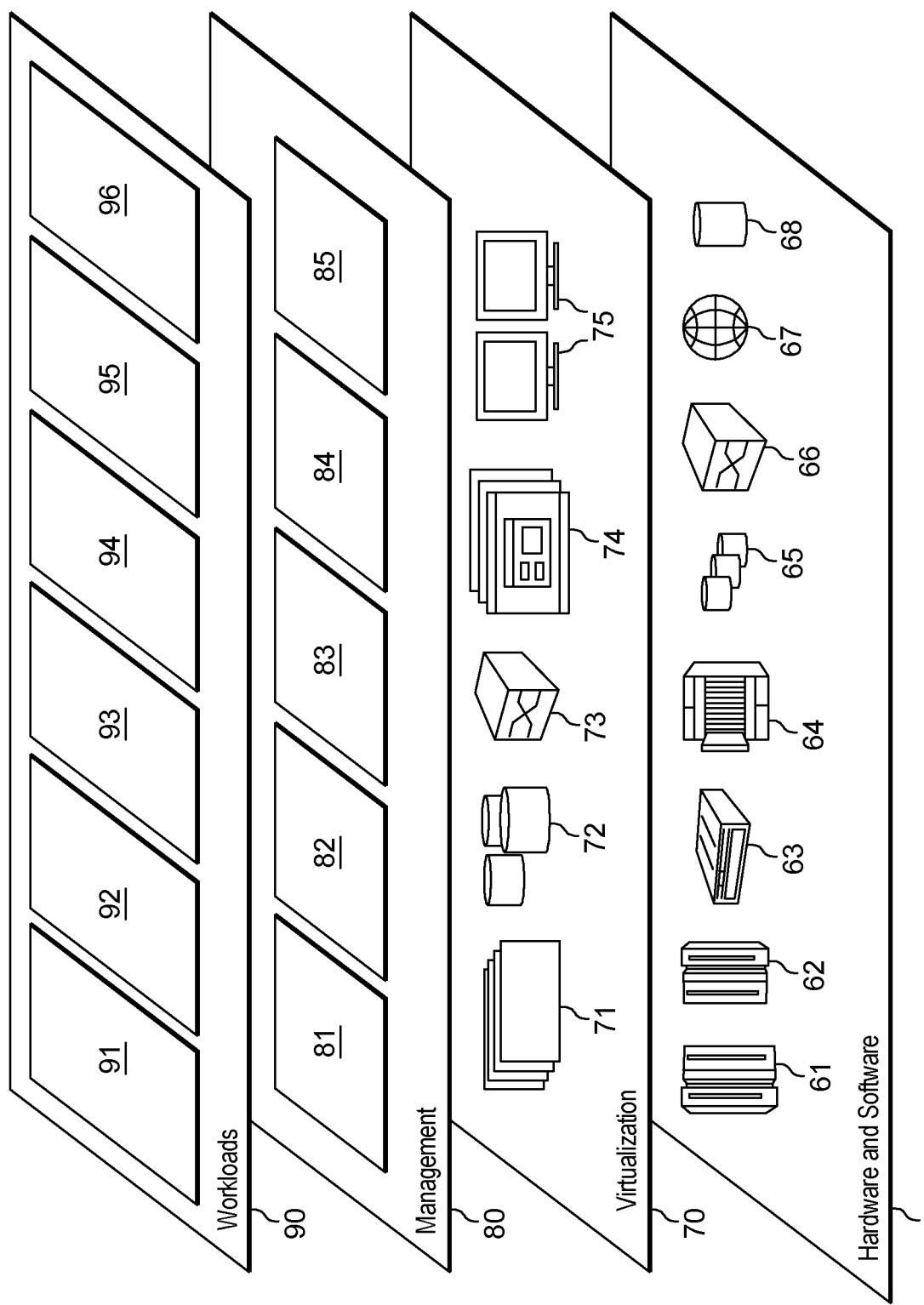
FIG. 6 depicts abstraction model layers according to an embodiment of the present invention.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and initiating a data communication/transmission connection between applications 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method, comprising:
   Deploying, by one or more processors, a first connector in a computing environment, wherein the first connector initializes data transmission connections to a first application;
   obtaining, by the first connector, at the first connector, at startup of the first connector, contextual information related to one or more additional connectors within a potential communication path of the first connector, wherein each of the one or more additional connectors initializes data transmission connections to a respective application;
   accessing, by the first connector, usage policy metadata of a second application, wherein the second application comprises the respective application of a second connector of the one or more additional connectors, wherein the usage policy metadata is selected from the group consisting of: static metadata accessible at the second connector and dynamic metadata accessible responsive to a call by the first connector to an application programming interface of the second application;
   determining, by the first connector, whether initializing a data transmission connection between the first application and the second application is consistent with the contextual information related to the second connector obtained by the first connector at startup and the usage policy metadata;
   based on determining that the contextual information and the usage policy metadata are inconsistent, transmitting, by the first connector, an error message indicating a connection failure;
   based on determining that the contextual information and the usage policy metadata are consistent, initializing, by the first connector, the data transmission connection between the first application and the second application through the first connector and the second connector; and
   wherein obtaining the contextual information related to one or more additional connectors comprises reading, by the first connector, a flow document of a computing network comprising the one or more processors.

2. The computer-implemented method of claim 1, wherein each of the data transmission connections to a first application are selected from the group consisting of: a bilateral connection for data flow and a unilateral connection for the data flow.

3. The computer-implemented method of claim 1, further comprising: based on initializing the data transmission connection between the first application and the second application, obtaining, via the first connector, by the first application, over the data transmission connection, data originating from the second application.

4. The computer-implemented method of claim 3, wherein the obtaining comprises obtaining the data, by the first application, via the first connector and the second connector, wherein the first connector and the second connector connect the first application to the second application over the data transmission connection.

5. The computer-implemented method of claim 1, wherein the contextual information comprises a parameter of invocation of the first application.

6. The computer-implemented method of claim 1, wherein accessing the usage policy metadata comprises reading the static metadata of the second connector.

7. The computer-implemented method of claim 1, wherein accessing the usage policy metadata comprises:
   making, by the first connector, the call to the second application via the application programming interface; and
   receiving, by the first connector, via the application programming interface, the dynamic metadata responsive to the call.

8. The computer-implemented method of claim 1, wherein determining whether initializing the data transmission connection between the first application and the second application is consistent with the contextual information related to the second connector and the usage policy metadata is based on initialization logic of the first connector.

9. The computer-implemented method of claim 8, wherein determining whether initializing the data transmission connection between the first application and the second application is consistent with the contextual information related to the second connector and the usage policy metadata is commenced subsequent to commencing initializing the data transmission connection.

10. The computer-implemented method of claim 1, wherein the usage policy metadata comprise a description of connectors permitted to connect to the second application.

11. The computer-implemented method of claim 1, wherein the usage policy metadata comprise a description of connectors not permitted to connect to the second application.

12. The computer-implemented method of claim 1, wherein the usage policy metadata comprise a description of purposes for which data transmission to the second application is permitted.

13. The computer-implemented method of claim 1, further comprising: updating, by the first connector, the flow document, with contextual information related to the first connector.

14. A computer program product comprising:
    a computer readable storage medium readable by one or more processors and storing instructions executed by the one or more processors performing a method comprising:
    deploying, by one or more processors, a first connector in a computing environment, wherein the first connector initializes data transmission connections to a first application;
    obtaining, by the first connector, at the first connector, at startup of the first connector, contextual information related to one or more additional connectors within a potential communication path of the first connector, wherein each of the one or more additional connectors initializes data transmission connections to a respective application;
    accessing, by the first connector, usage policy metadata of a second application, wherein the second application comprises the respective application of a second connector of the one or more additional connectors, wherein the usage policy metadata is selected from the group consisting of: static metadata accessible at the second connector and dynamic metadata accessible responsive to a call by the first connector to an application programming interface of the second application;

determining, by the first connector, whether initializing a data transmission connection between the first application and the second application is consistent with the contextual information related to the second connector obtained by the first connector at startup and the usage policy metadata;

based on determining that the contextual information and the usage policy metadata are inconsistent, transmitting, by the first connector, an error message indicating a connection failure;

based on determining that the contextual information and the usage policy metadata are consistent, initializing, by the first connector, the data transmission connection between the first application and the second application through the first connector and the second connector; and wherein obtaining the contextual information related to one or more additional connectors comprises reading, by the first connector, a flow document of a computing network comprising the one or more processors.

15. The computer program product of claim 14, wherein each of the data transmission connections to a first application are selected from the group consisting of: a bilateral connection for data flow and a unilateral connection for the data flow.

16. The computer program product of claim 14, the method further comprising: based on initializing the data transmission connection between the first application and the second application, obtaining, via the first connector, by the first application, over the data transmission connection, data originating from the second application, via the second connector.

17. A system comprising:

a memory;

one or more processors in communication with the memory; and program instructions executed by the one or more processors via the memory to perform a method, the method comprising:

deploying, by one or more processors, a first connector in a computing environment, wherein the first connector initializes data transmission connections to a first application;

obtaining, by the first connector, at the first connector, at startup of the first connector, contextual information related to one or more additional connectors within a potential communication path of the first connector, wherein each of the one or more additional connectors initializes data transmission connections to a respective application;

accessing, by the first connector, usage policy metadata of a second application, wherein the second application comprises the respective application of a second connector of the one or more additional connectors, wherein the usage policy metadata is selected from the group consisting of: static metadata accessible at the second connector and dynamic metadata accessible responsive to a call by the first connector to an application programming interface of the second application;

determining, by the first connector, whether initializing a data transmission connection between the first application and the second application is consistent with the contextual information related to the second connector obtained by the first connector at startup and the usage policy metadata;

based on determining that the contextual information and the usage policy metadata are inconsistent, transmitting, by the first connector, an error message indicating a connection failure;

based on determining that the contextual information and the usage policy metadata are consistent, initializing, by the first connector, the data transmission connection between the first application and the second application through the first connector and the second connector; and wherein obtaining the contextual information related to one or more additional connectors comprises reading, by the first connector, a flow document of a computing network comprising the one or more processors.

* * * * *